(12) United States Patent
Cowan et al.

(10) Patent No.: US 7,857,455 B2
(45) Date of Patent: Dec. 28, 2010

(54) COMBINING P AND S RAYS FOR BRIGHT STEREOSCOPIC PROJECTION

(75) Inventors: Matt Cowan, Bloomingdale (CA); Lenny Lipton, Los Angeles, CA (US); Jerry Carollo, Carlsbad, CA (US)

(73) Assignee: RealD Inc., Beverly Hills, CA (US)

( * ) Notice: Subject to any disclaimer, the term of this patent is extended or adjusted under 35 U.S.C. 154(b) by 761 days.

(21) Appl. No.: 11/583,243

(22) Filed: Oct. 18, 2006

(65) Prior Publication Data

US 2008/0143965 A1 Jun. 19, 2008

(51) Int. Cl.
*G03B 21/14* (2006.01)

(52) U.S. Cl. .............. 353/20; 353/7; 353/8; 353/98; 353/99; 353/31; 349/5; 349/7; 349/15; 349/18; 349/97; 349/106; 349/115; 349/117; 348/42; 348/57; 348/58; 348/59; 348/60; 359/462; 359/465; 359/40; 359/63; 359/70; 359/463; 359/495; 359/496; 359/497; 352/60

(58) Field of Classification Search ........... 349/15, 349/18, 67, 96, 113, 114, 117, 89, 97, 106, 349/115, 5, 7; 353/7, 8, 20, 30, 31, 98, 99; 348/42, 57, 58, 59, 60; 359/462, 464, 465; 352/60

See application file for complete search history.

(56) References Cited

U.S. PATENT DOCUMENTS

| | | | |
|---|---|---|---|
| 3,704,997 A | | 12/1972 | Smith |
| 4,792,850 A | * | 12/1988 | Liptoh et al. ............ 348/57 |
| 5,278,680 A | | 1/1994 | Karasawa |
| 5,566,367 A | | 10/1996 | Mitsutake et al. |
| 5,917,568 A | * | 6/1999 | Johnson et al. ........... 349/116 |
| 5,993,004 A | * | 11/1999 | Moseley et al. .......... 353/8 |
| 6,252,624 B1 | * | 6/2001 | Yuasa et al. ............. 348/56 |
| 6,280,034 B1 | * | 8/2001 | Brennesholtz ........... 353/20 |

(Continued)

FOREIGN PATENT DOCUMENTS

WO 2006038744 A 4/2006

OTHER PUBLICATIONS

International Preliminary Examination Report for PCT/US07/21823 mailed May 14, 2009.

(Continued)

*Primary Examiner*—Georgia Y Epps
*Assistant Examiner*—Sultan Chowdhury
(74) *Attorney, Agent, or Firm*—Baker & McKenzie LLP

(57) ABSTRACT

A multiple path stereoscopic projection system is disclosed. The system comprises a polarizing splitting element configured to receive image light energy and split the image light energy received into a primary path and a secondary path, a reflector in the secondary path, and a polarization modulator or polarization modulator arrangement positioned in the primary path and configured to modulate the primary path of light energy. A polarization modulator may be included within the secondary path, a retarder may be used, and optional devices that may be successfully employed in the system include elements to substantially optically superimpose light energy transmission between paths and cleanup polarizers. The projection system can enhance the brightness of stereoscopic images perceived by a viewer. Static polarizer dual projection implementations free of polarization modulators are also provided.

23 Claims, 12 Drawing Sheets

U.S. PATENT DOCUMENTS

| | | | |
|---|---|---|---|
| 6,288,840 B1* | 9/2001 | Perkins et al. | 359/486 |
| 6,375,327 B2 | 4/2002 | Holman et al. | |
| 6,454,416 B2* | 9/2002 | Aoto et al. | 353/31 |
| 6,547,396 B1* | 4/2003 | Svardal et al. | 353/8 |
| 6,704,065 B1* | 3/2004 | Sharp et al. | 349/5 |
| 7,008,070 B2 | 3/2006 | Nishida et al. | |
| 7,131,737 B2 | 11/2006 | Silverstein et al. | |
| 7,204,592 B2* | 4/2007 | O'Donnell et al. | 353/7 |
| 7,261,453 B2 | 8/2007 | Morejon et al. | |
| 7,270,416 B2 | 9/2007 | Yamanaka et al. | |
| 7,295,371 B1 | 11/2007 | Sedlmayr | |
| 7,753,531 B2* | 7/2010 | Fujita et al. | 353/50 |
| 2001/0013971 A1* | 8/2001 | Kleinberger et al. | 359/465 |
| 2006/0007537 A1 | 1/2006 | Sedlmayr | |
| 2006/0044516 A1* | 3/2006 | Inoko | 353/20 |
| 2006/0092380 A1 | 5/2006 | Salsman et al. | |
| 2006/0215118 A1* | 9/2006 | Sonehara | 353/20 |
| 2006/0221429 A1* | 10/2006 | Christensen et al. | 359/279 |
| 2008/0225236 A1 | 9/2008 | Schuck et al. | |

OTHER PUBLICATIONS

European Application No. 07852705.8, Supplementary European Search Report dated Oct. 16, 2009.

S. Pastor et al., "3-D displays: A review of current technologies", Displays Devices, Dempa Publications, Tokyo, JP, vol. 17, No. 2, Apr. 1, 1997, pp. 100-110.

International search report and written opinion of international searching authority for PCT/US07/21823 mailed Apr. 2, 2008.

International search report and written opinion of international searching authority for PCT/US07/79958 mailed Jul. 28, 2008.

International preliminary report on patentability for PCT/US07/79958 mailed Apr. 9, 2009.

* cited by examiner

FIG. 7

Combinations of clean-up polarizers and retarders for Static Polarizer Situation

| Condition | | | First Projector | | | | | | Second Projector | | | | |
|---|---|---|---|---|---|---|---|---|---|---|---|---|---|
| | | | Primary Beam | | Secondary Beam | | | Primary Beam | | Secondary Beam | | |
| | | Polarization | Retarder | Clean-up (linear) 311 | Retarder 306 | Clean-up (linear) 305 | | Retarder | Clean-up (linear) 311 | Retarder 306 | Clean-up (linear) 305 |
| 701 → FIG. 3 element | | Linear | | | | | | | | | | |
| 702 → Linear polarizer with Polarizing Beam Splitter assembly in symmetrical orientation – one channel needs rotation | | | None | Not required | Half wave | Not required | | Half wave | Not required | None | Not required |
| | | | None | Not required | Half wave | Linear | | Half wave | Not required | None | Linear |
| | | | Half wave | Not required | Not required | Not required | | Not required | Not required | Half wave | Not required |
| | | | Half wave | Not required | Not required | Linear | | Not required | Not required | Half wave | Linear |
| | | | None | Linear | Half wave | Not required | | Half wave | Linear | None | Not required |
| | | | None | Linear | Half wave | Linear | | Half wave | Linear | None | Linear |
| | | | Half wave | Linear | Not required | Not required | | Not required | Linear | Half wave | Not required |
| | | | Half wave | Linear | Not required | Linear | | Not required | Linear | Half wave | Linear |
| 703 → Linear polarizer with one projector Polarizing Beam Splitter rotated 90 degrees about optical axis | | Linear | None | Not required | Half wave | Not required | | None | Not required | Half wave | Not required |
| | | | None | Not required | Half wave | Linear | | None | Not required | Half wave | Linear |
| | | | Half wave | Not required | Not required | Not required | | Half wave | Not required | Not required | Not required |
| | | | Half wave | Not required | Not required | Linear | | Half wave | Not required | Not required | Linear |
| | | | None | Linear | Half wave | Not required | | None | Linear | Half wave | Not required |
| | | | None | Linear | Half wave | Linear | | None | Linear | Half wave | Linear |
| | | | Half wave | Linear | Not required | Not required | | Half wave | Linear | Not required | Not required |
| | | | Half wave | Linear | Not required | Linear | | Half wave | Linear | Not required | Linear |
| 704 → Polarizing Beam Splitter arranged symmetrically on left and right projectors | | Circular | Quarter left | Not required | Quarter right | Not required | | Quarter right | Not required | Quarter left | Not required |
| | | | Quarter left | linear | Quarter right | Not required | | Quarter right | linear | Quarter left | Not required |
| | | | Quarter left | Not required | Quarter right | Linear | | Quarter right | Not required | Quarter left | Linear |
| | | | Quarter left | linear | Quarter right | Linear | | Quarter right | linear | Quarter left | Linear |
| 705 → One Polarizing Beam Splitter rotated 90 degrees to other | | Circular | Quarter left | Not required | Quarter right | Not required | | Quarter left | Not required | Quarter right | Not required |
| | | | Quarter left | linear | Quarter right | Not required | | Quarter left | linear | Quarter right | Not required |
| | | | Quarter left | Not required | Quarter right | Linear | | Quarter left | Not required | Quarter right | Linear |
| | | | Quarter left | linear | Quarter right | Linear | | Quarter left | linear | Quarter right | Linear |

US 7,857,455 B2

COMBINING P AND S RAYS FOR BRIGHT STEREOSCOPIC PROJECTION

BACKGROUND OF THE INVENTION

1. Field of the Invention

The field of the present invention is the display of stereoscopic motion pictures, and more specifically to increasing image brightness in the projection of stereoscopic images.

2. Description of the Related Art

Stereographic moving images are frequently transmitted using projection systems, including but not limited to the ZScreen® product available from Real D and StereoGraphics® Corporation. A primary concern relating to stereoscopic image projection is the low brightness of the image on the screen. The ZScreen and other similar approaches employ at least one absorption sheet polarizer for stereoscopic image selection, and in case, the brightness of the image is reduced by at least fifty percent. In other words, the stereoscopic image is less than half the brightness of a projected planar image. Since analyzer polarizers are used for image selection, the final brightness results from the losses of two parallel axes polarizers giving considerably less than half the planar brightness.

One technique that has been employed to decrease the brightness loss due to projection using polarizer image selection is to use high gain projection screens. This method can partially mitigate the loss in brightness, but the fundamental light loss problem associated with absorption polarizers remains because sheet polarizers achieve their function by passing through light polarized along the polarizer's transmission axis and holding back the remainder of the light. The light held back heats the polarizer instead of providing useful illumination.

It is therefore beneficial to address and overcome the brightness issue present in previously known stereoscopic image selection techniques for projection, and to provide a stereoscopic projection apparatus or design having improved brightness over devices exhibiting the light loss described herein.

SUMMARY OF THE INVENTION

According to a first aspect of the present design, there is provided an apparatus for projecting stereoscopic images. The apparatus comprises a polarizing splitting element configured to receive image light energy and split the image light energy received into a primary path (P path) of light energy along with a secondary path (S path) of light energy. The apparatus further comprises a reflector configured to receive secondary path light energy and direct reflected secondary path light energy toward a projection surface. A first polarization modulator is employed, the first polarization modulator positioned in the primary path and configured to receive the primary path of light energy, modulate the primary path of light energy into primary path light energy, and transmit primary path modulated light energy toward the surface or projection screen.

A retarder and a secondary polarization modulator may be employed, the retarder configured to receive either the primary or secondary path of light energy and transmit rotated primary or secondary path light energy, and the secondary polarization modulator positioned in the secondary path and configured to receive the secondary path of light energy, modulate the secondary path of light energy into secondary path polarized light energy, and transmit secondary path modulated light energy toward a mirror or reflecting surface and then to the projection surface.

According to a second aspect of the present design, there is provided a method of projecting stereoscopic images. The method comprises receiving image light energy, splitting the image light energy received into a primary path of light energy transmitted along a primary path and a secondary path of light energy transmitted along a secondary path. The method also comprises receiving secondary path light energy and directing reflected secondary path light energy toward a surface and modulating the primary path of light energy into primary path modulated light energy, and transmitting primary path modulated light energy toward the surface.

According to a third aspect of the present design, there is provided an apparatus for projecting stereoscopic images. The apparatus comprises a splitter configured to split the image received into a primary path and a secondary path, a reflector positioned in the secondary path configured to reflect secondary path light energy, and a polarization modulator arrangement comprising at least one polarization modulator positioned in the primary path and configured to modulate the primary path of light energy. The polarization modulator arrangement additionally modulates secondary path light energy.

According to a fourth aspect of the present design, there is provided an apparatus for projecting stereoscopic images. The apparatus comprises a polarizing splitting element configured to receive image light energy and split the image light energy received into a primary path of light energy transmitted along a primary path and a secondary path of light energy transmitted along a secondary path, a reflector configured to receive path light energy from one of primary path energy and secondary path light energy and the path light energy toward a surface, and a static polarizer element configured to rotate one of said primary path light energy and said secondary path light energy.

These and other objects and advantages of the present invention will become apparent to those skilled in the art from the following detailed description of the invention and the accompanying drawings.

DESCRIPTION OF THE DRAWINGS

FIG. 7 is a tabular compilation of various static polarizer design alternatives employable using the teachings provided herein.

DETAILED DESCRIPTION OF THE INVENTION

The present design seeks to increase overall brightness in a projected stereoscopic image using polarization for image selection. The system creates a dual path arrangement that can greatly increase the brightness of the image perceived by the viewer—in essence almost doubling the amount of light energy projected on the screen.

Figure 1A:
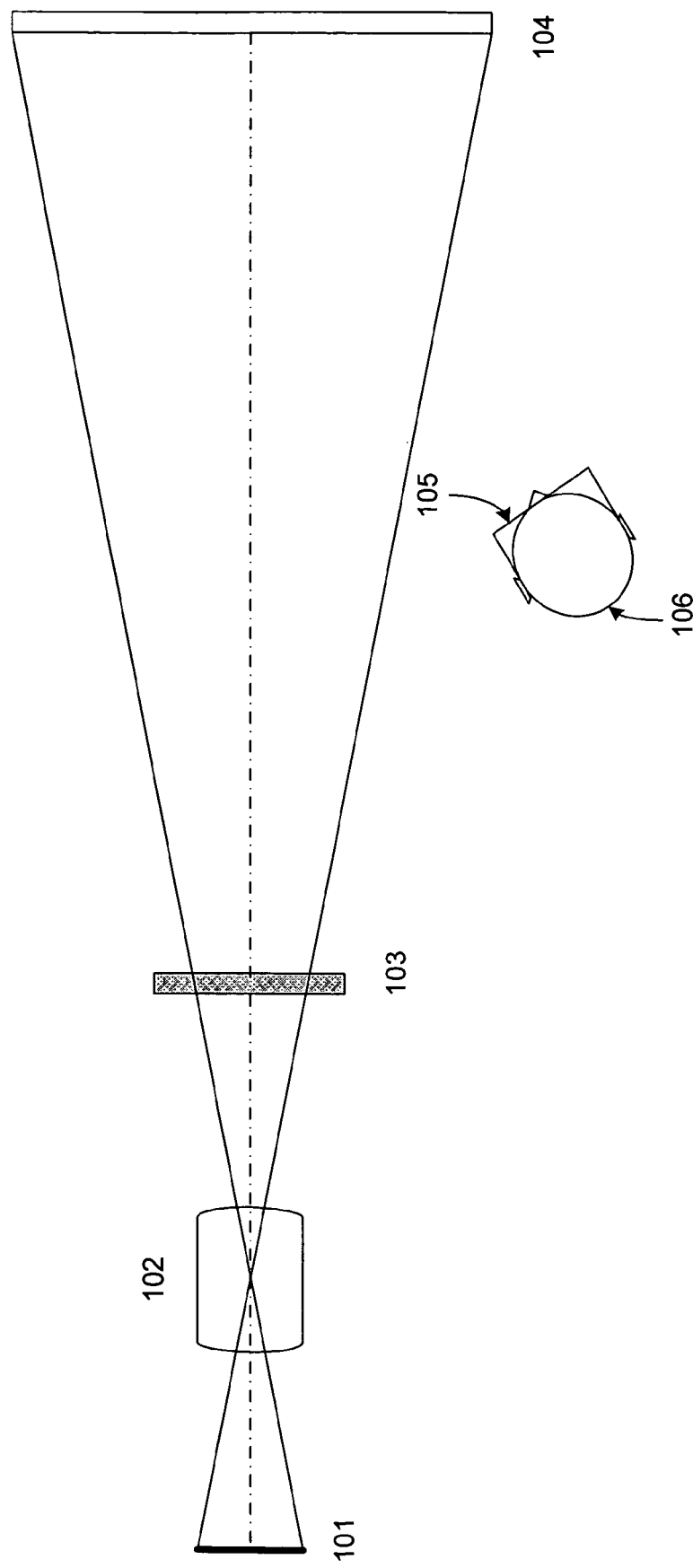
FIG. 1A illustrates a previous single path projection system design.

A previous stereoscopic projection system is described in FIG. 1A. The design of FIG. 1A uses a single projector having imaging surface 101 and lens 102. Mounted in front of the projection lens 102 is a ZScreen as manufactured and sold for more than a decade by StereoGraphics Corp. The ZScreen polarization modulator has been described in great detail in Lipton U.S. Pat. No. 4,792,850, which is hereby incorporated by reference. The image is produced using the field-sequential or time-multiplex format for the viewing of stereoscopic computer generated and camera produced images and is well known and understood. Observer 106 wearing polarizing image selection eyewear 105 views the image projected on screen 104 and that screen has polarization conserving characteristics. The ZScreen 103 is described in greater detail in FIG. 1B and is used in conjunction with at least one embodiment of this disclosure. The projector produces a stream of alternating left and right image fields and these fields of perspective information are selected for the appropriate eye by means of polarization image selection. The ZScreen electro-optical polarization modulator switches its characteristics of polarization at field rate between left and right handed circularly polarized light and the eyewear worn by the observer 106 use analyzers incorporating left and right handed circular polarizers.

Note that in FIG. 1A, as with every drawing presented herein, the drawing is specifically not to scale, either with respect to component sizes or the physical dimensional relationship between components. It is to be appreciated that the drawings are intended to disclose and teach the inventive concepts disclosed herein and the dimensions and relationships between the elements presented are not to scale.

Figure 1B:
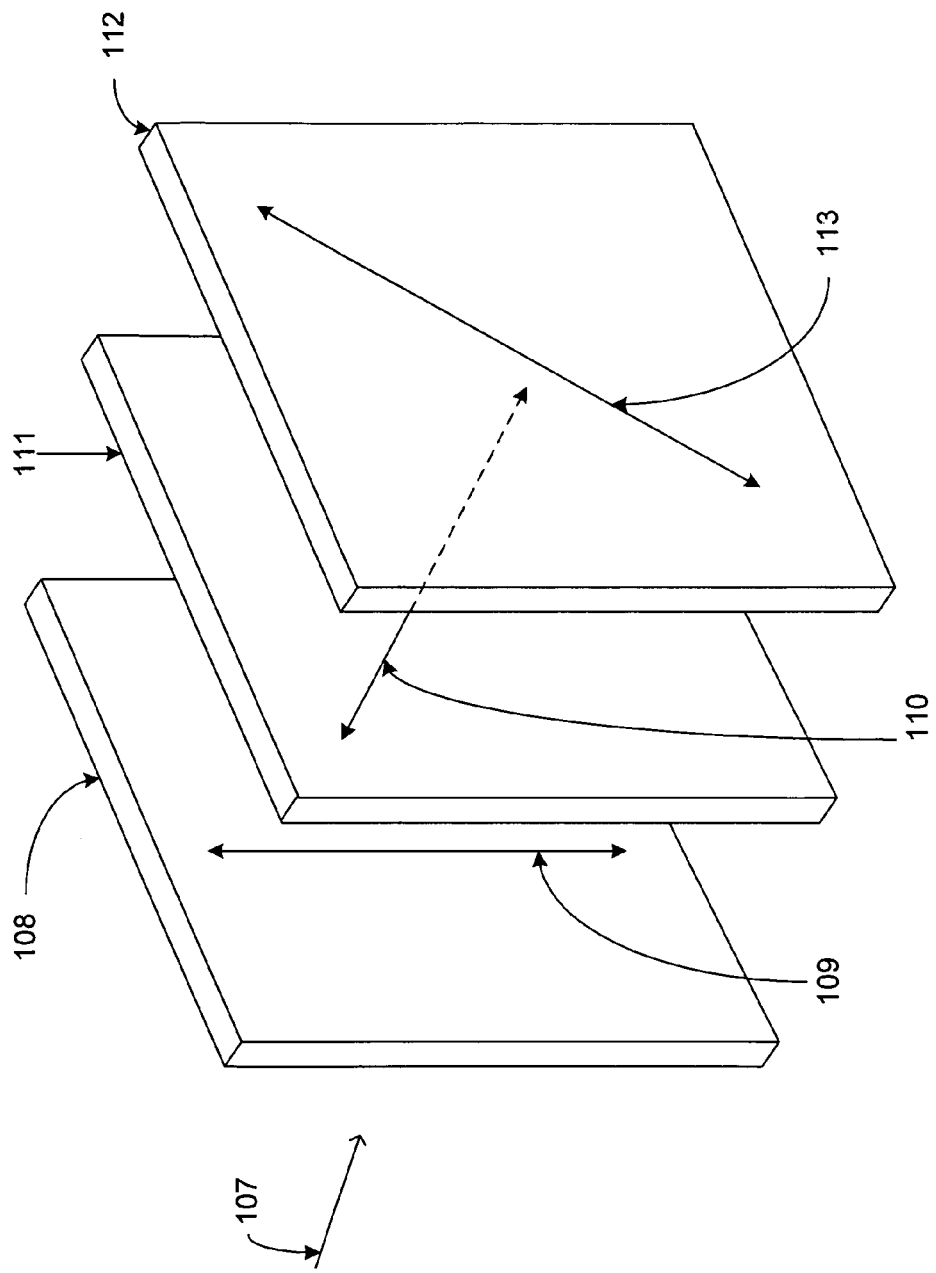
FIG. 1B shows the detailed construction and functionality of a polarization modulator usable in the present design, namely the ZScreen.

FIG. 1B gives the detailed construction and functionality of the ZScreen or as it is also known, push-pull modulator. Ray 107 is representative of a central ray (and all image forming rays) of unpolarized light passing through device or ZScreen 102. Ray 107 passes through linear polarizer 108 whose axis is given by the double-headed arrowed line 109. The ZScreen, to properly modulate received light energy, requires the input of linearly polarized light. The ZScreen is made up of two electro-optical cells, or pi-cells, also known as surface mode devices, one shown as pi-cell 111 with axis 110, and the other as pi-cell 112 with axis 113. The pi-cells 111 and 112 are phase shifting devices and in this case they are tuned to quarter wave retardation so as to turn the linear polarized light input by polarizer 108 into circularly polarized light that alternates between left and right handedness. In order to perform properly, the orientation of the parts and their axes is as given in the drawing and described herein. The parts are substantially or precisely coplanar and the axes of the pi-cells are orthogonal and bisected by the axis of the polarizer. In other words, the linear polarizer axis is at 45 degrees to the axes of the pi-cells.

The pi-cells are electrically driven out of phase and produce an effect similar or identical to that of a quarter wave retarder rapidly rotated through 90 degrees. In this manner, well known in the art, linearly polarized light is turned into circularly polarized light and because of the effective toggling of the axes of the pi-cells, left and right handed circularly polarized light is produced in synchrony with the field rate and image perspectives as projected.

As used herein, electro-optical devices such as the ZScreen will be generically referred to as "electro-optical polarization modulators" or simply "polarization modulators." Polarizers are a constituent component of the polarization modulator providing the required polarized light to enable modulator functionality. The polarization modulators disclosed herein are primarily electro-optical but other non-electro-optical devices may be employed.

Figure 5A:
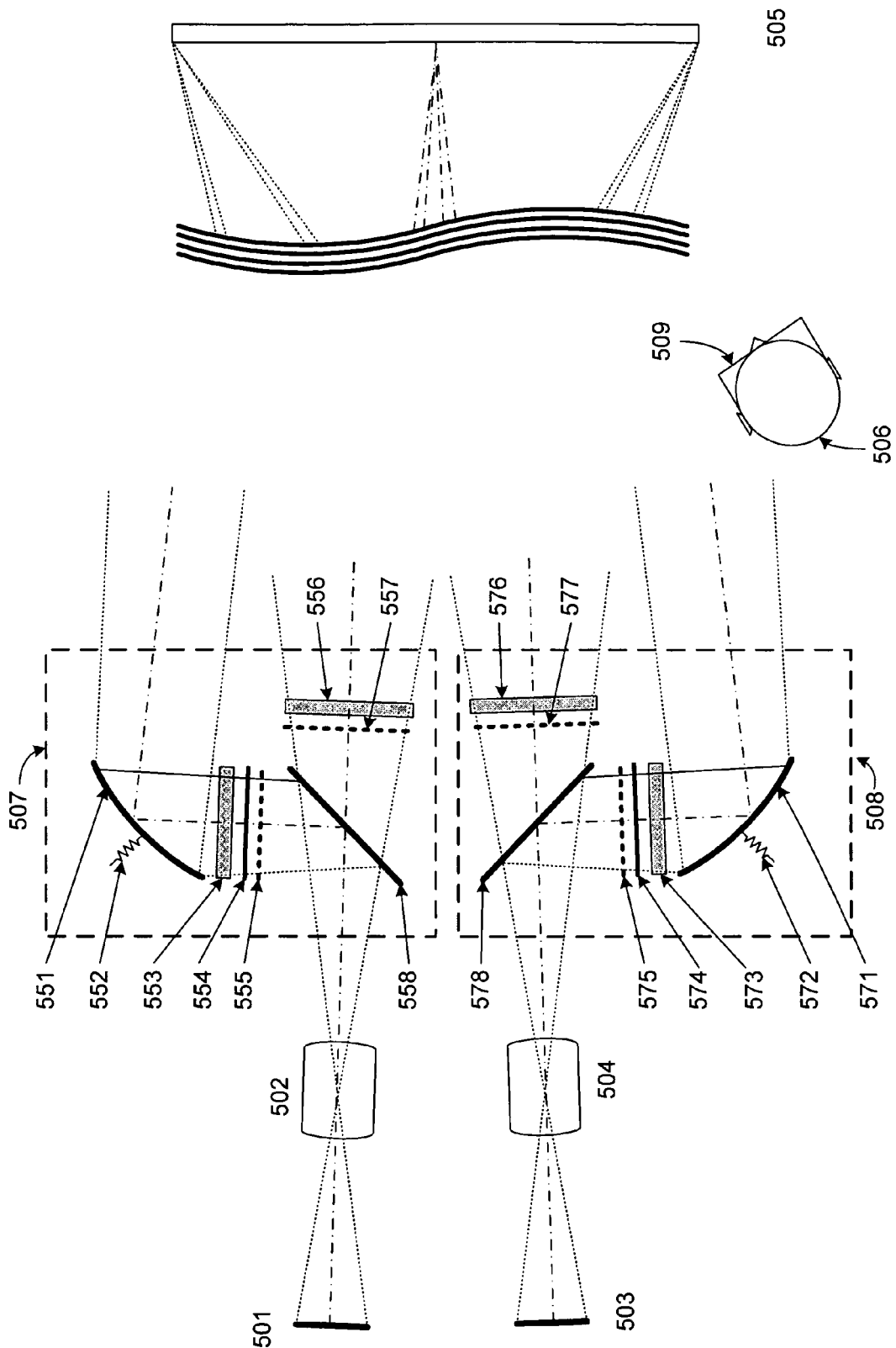
FIG. 5A represents two dual path projection systems in an arrangement similar to FIG. 2 but using two instances of the novel dual path projection design presented herein in a circular polarization arrangement employing polarization modulators.
Figure 5B:
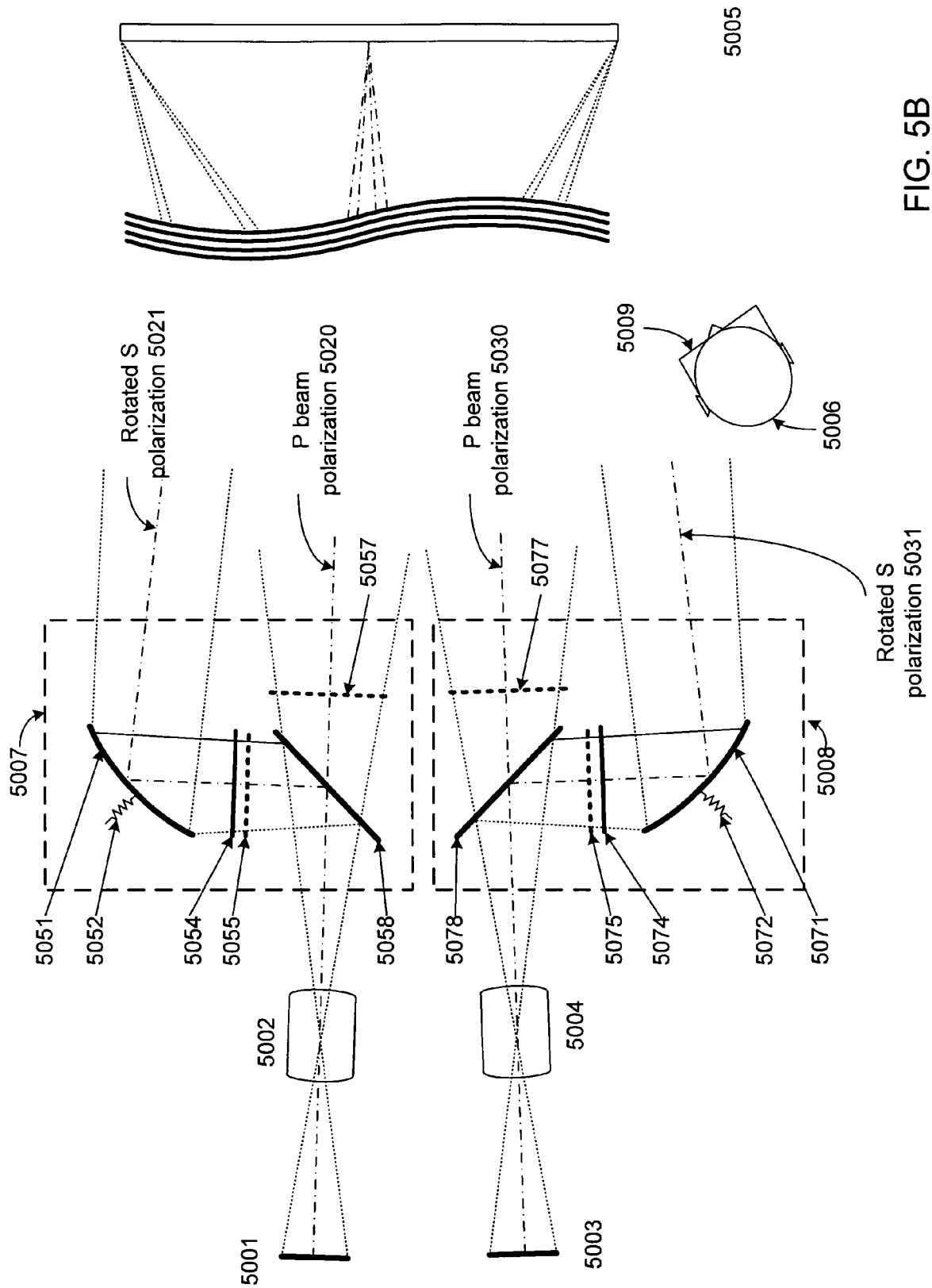
FIG. 5B shows a linear polarizer alternative to the design of FIG. 5A, using no polarizing modulators but operating in a different manner.

The polarizing device may be linear polarizers, circular polarizers, or a ZScreen and are typically of the sheet polarizer type. Other polarization producing devices may be used. By any one of these sheet polarizers (or polarization modulator devices as shown in FIG. 5B) the light of each projector is encoded with a certain specific polarization characteristic that can be analyzed by the eyewear or spectacles 208 such that each eye sees its appropriate perspective view. Each projector projects one of the two perspective views required for a stereoscopic image to be appreciated by observer 209. The manner of producing and projecting these stereoscopic images is well known in the art, and reference is made to, for example, *Foundations of the Stereoscopic Cinema* by Lipton, published by Van Nostrand Reinhold, New York, 1982, which describes the general method of producing and projecting stereoscopic images, the entirety of which is incorporated herein by reference. Projection in this manner, usually using sheet linear polarizers, is extant in theme parks and location based entertainment venues.

While the term "circular" is used herein with respect to the polarization, it is to be understood that with respect to polarization modulators such as the ZScreen, polarization is circular at the desired wavelength and may be elliptical at other wavelengths. As used herein, the term "circular" or "circular polarization" or "circularly polarized" is intended to cover any elliptical type of polarization, i.e. polarization at any wavelength under any generally elliptical and non-linear polarization. It is understood by those versed in the art that by relatively simple means, linear and circular polarization states may be managed so as to convert one type into another and nothing in this discussion precludes the use of one type when the other is referred to.

Figure 2:
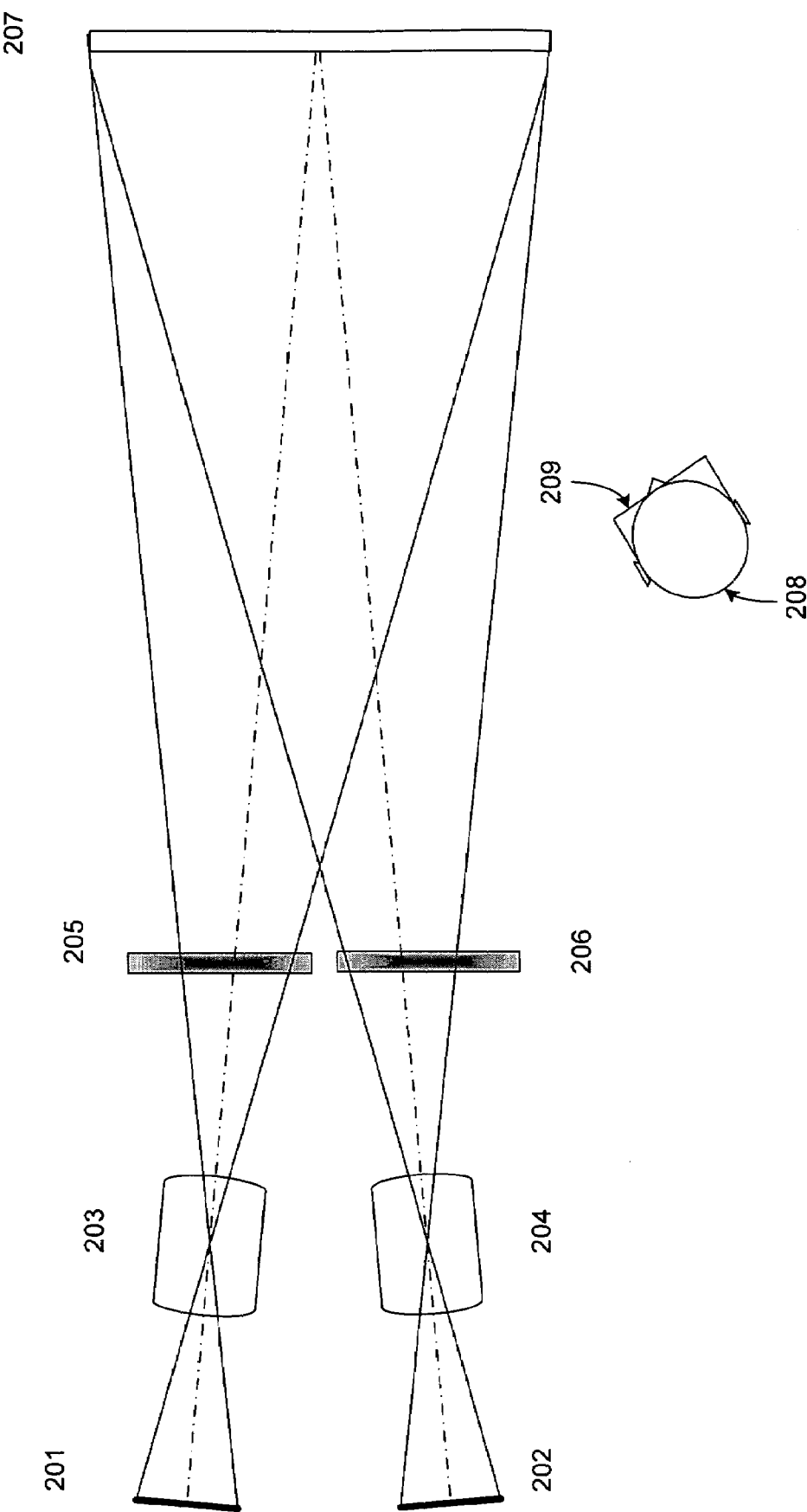
FIG. 2 is a dual projection system for projecting stereoscopic images that has been employed for many decades.

The traditional method for projecting stereoscopic movies, first discussed more than 100 years ago, is described with the help of FIG. 2. Two projectors are used in conjunction with polarizers 205 and 206, a polarization conserving screen 207, and audience members 208 wearing analyzing eyewear 209. The polarizers 205 and 206 shown are known as static polarizers and differ from the polarization modulators or ZScreen embodiments disclosed herein. The projectors are represented, first for the left machine, by image surface 201, lens 203, and polarizing device 205. For the right machine the image surface is given by 202, the lens by 204, and the polarizing device by 206. When projecting stereoscopic images or movies, the device of FIG. 2 typically transmits images from image surface 201 and 202 at orthogonal axes, thereby producing the stereoscopic effect.

Figure 3:
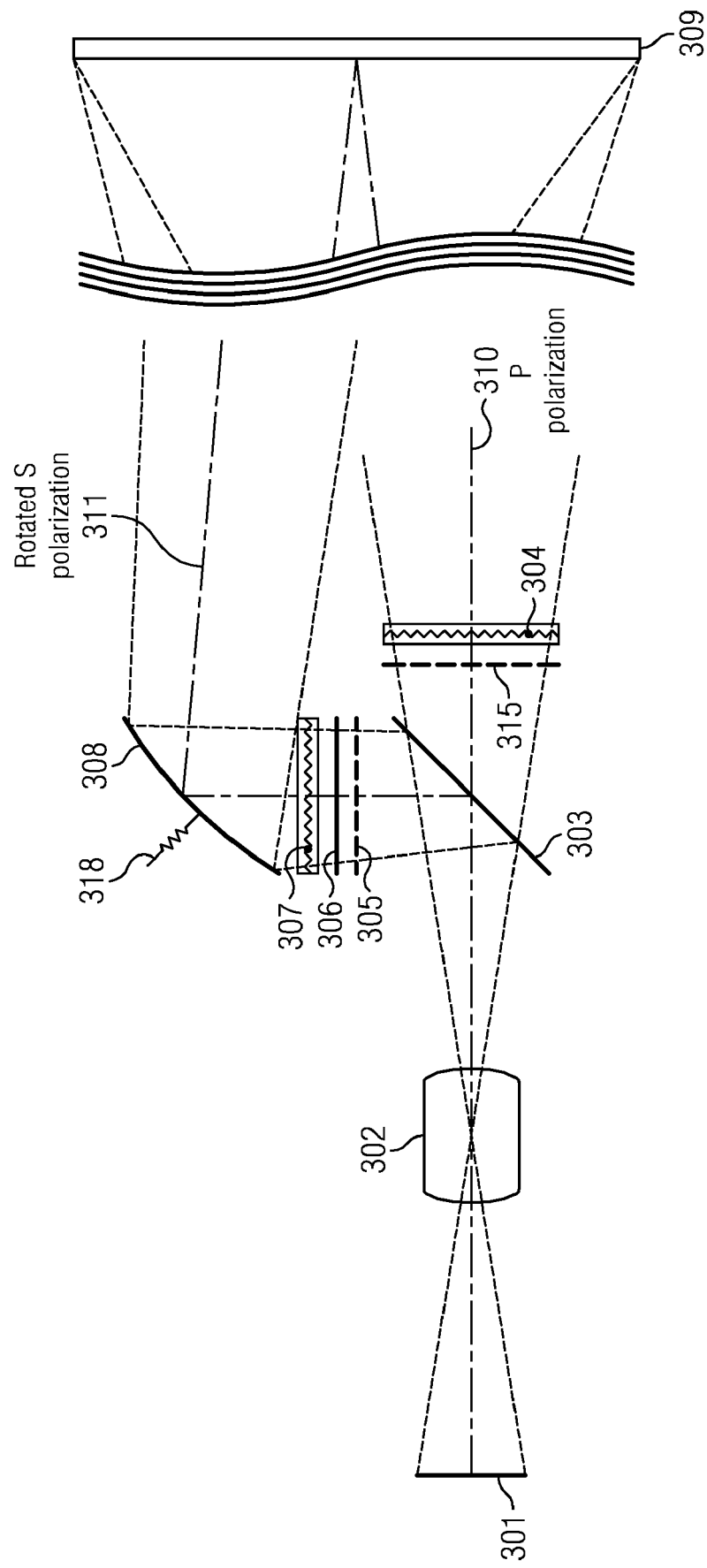
FIG. 3 illustrates the novel dual path projection system of the present design.

FIG. 3 illustrates the layout of the present apparatus. The projection system includes an imaging surface 301 inside the projector and the projection lens 302. Light from a source within the projector (not shown) is modulated by the imaging surface and sent to the projection lens. The light will generally be non-polarized exiting the lens, but in some instances, the light may be polarized to some extent. In a typical system, the light is eventually projected through a polarization modulator (or modulators) 304 and 307 such as the aforementioned ZScreen to a projection surface 309, typically a projection screen. The system of FIG. 3 separates the light beam or light energy into two paths, a primary path P and a secondary path S, or more specifically into orthogonal polarization states using a polarizing splitter 303. Polarizing splitter 303 may be a polarizing beamsplitter such as a glass prism or MacNeille prism, or a wire grid polarizer, or other device able to create P and S beams with substantially orthogonal polarization states. In such a case the P rays 310 project straight through the splitter 303 and have one polarization orientation, along a primary path, and the S rays 311 are reflected along a secondary path with orthogonal polarization to the P rays.

Polarization of the S rays is, in one embodiment rotated by 90 degrees using a half wave retarder 306. In an alternative embodiment, the S ray polarization remains non-rotated and the P ray polarization is alternately rotated by placing the half wave retarder in the transmitted beam instead of the reflected beam, or in other words, a half wave retarder is placed after the polarizing splitter 303 or between polarizing splitter 303 and projection screen 309.

Rotation of the axes of the polarized beams, either P or S, is required in order to make the axes parallel. As employed herein, to clarify any issues regarding nomenclature, a beam designated as P or S indicates that beam comes from a splitter in that form, and thus while the beam may be altered in form by retarders or other components, the beam originally was either transmitted or reflected in the format identified. In the case of FIG. 3, the circular polarization resulting from the polarization modulators' action typically provides a relatively high dynamic range when analyzed provided that the linear components' axes of the polarizers and analyzers are orthogonal, which is relatively straightforward to manage as is known in the art. If the S and P beams have their axes orthogonal, the circularly polarized light outputted by the polarizing modulators or ZScreen will be made up of components of circularly polarized light partially made up of circularly polarized light whose maximum dynamic range may be analyzed at two positions orthogonal to each other. It is not possible to achieve this using the sheet polarizer analyzers currently available. Thus the axes of one beam must be rotated, but it is immaterial which so long as both enter the polarization modulators with axes parallel.

Polarization beamsplitters may in some circumstances not provide a sufficiently pure linear polarization and can require a "clean-up" polarizer 305, 315 also referred to herein as a static polarizer. Such a clean-up polarizer 305, 315 is generally known in the art and is optional in the configuration shown or in other configurations. In general practice, the transmitted beam P has a high degree of purity, and the reflected beam S less so. In an embodiment of FIG. 3, the cleanup polarizer 305 is required only in the reflected (S) or secondary beam path, but may also be placed in the primary path (see, e.g., 315). Further, any clean-up polarizer may be placed in any location after the polarizing beamsplitter or wire grid polarizer 303 in the device shown. For example, while clean-up polarizer 305 is shown between the polarizing beamsplitter or wire grid polarizer 303 and half wave retarder 306 in practice clean-up polarizer 305 may be positioned between 307 and 305, or in the P path between 303 and 315 or 315 and 304.

Once the P and S beams have achieved a high degree of polarization, the beams are then modulated by the polarization modulators or ZScreens 304 and 307 in the manner described in FIG. 1. At this point, the device is projecting two beams of light, the primary P beam and reflected beam or secondary S beam, respectively.

The secondary S beam needs to bend in the direction of the projection screen 309. A reflective surface such as a mirror 308 (or other reflecting device such as a prism) can be used to do this bending. The mirror 308 is capable of adjusting beam path angles such that the primary and secondary beams may be aligned precisely on the projection screen 309. At this point the path length to the screen 309 is different for the two beams, and this will result in a difference in magnification and poor resultant image quality since the two images do not precisely overlap. The mirror 308 is therefore preferably deformable to provide optical power, adjust for the difference in magnification of the two beams, and substantially match the magnification of the primary path and secondary path to strike the same position on the projection screen 309. The deformable mirror or reflective surface may be an essentially planar front surface mirror with a mechanical element 318 capable of pulling or pushing a point such as the center of the surface of the reflective surface to form an approximation of an elliptical surface to provide the required optical power. More than one mechanical element may be employed and any mechanical element employed may be positioned anywhere around the reflective surface. The mirror or reflective surface may also be deformed using other means, including but not limited to fabricating an appropriately optically powered reflective surface having curvature built therein, or deforming or altering the surface using means other than mechanical deformation. In addition a set of mirrors figured with various curvatures may be provided to be interchangeably used in the optical path in place of part 308 so that a mirror of the correct focal length may be chosen from amongst the set to cause the primary and secondary beams' images to have the same magnification.

While not shown in FIG. 3 or any specific drawing, a single relatively large polarization modulator or ZScreen may be employed coving both P and S paths rather than the two polarization modulators or ZScreens 304 and 307. In such an embodiment, the large ZScreen or polarization modulator would be placed in line or parallel to the screen 309 relative to polarization modulator or ZScreen 304 and extend upward to be positioned also between deformable reflective surface or mirror 308 and the screen 309. One can imagine polarizing modulator 304 being extended upwards to cover the rays reflected by mirror 308.

Further, while not specifically shown in FIG. 3, an alternate arrangement may be employed wherein the P beam from the polarizing splitter 303 contacts a reflective surface and the S beam proceeds toward the screen 309 without contacting a reflective surface or mirror. Such an arrangement may be achieved if the imaging surface 301 and projection lens 302 are, for example, pointing in a direction 90 degrees offset from the screen 309 rather than directly at the screen 309. The key is for the S and P light energy paths to substantially coincide at the screen 309 using reflective surfaces where required in order to achieve increased brightness. An embodiment using different components and altering the S and P paths is shown in FIG. 6 described below.

The representation of FIG. 3 contemplates circular polarization with respect to various components shown, including but not limited to polarization modulators 604 and 607. However, it should be noted that linear polarization may also be employed, replacing the circularly polarized or polarizing elements of FIG. 3 with linearly polarized elements.

Figures 4A, 4C:
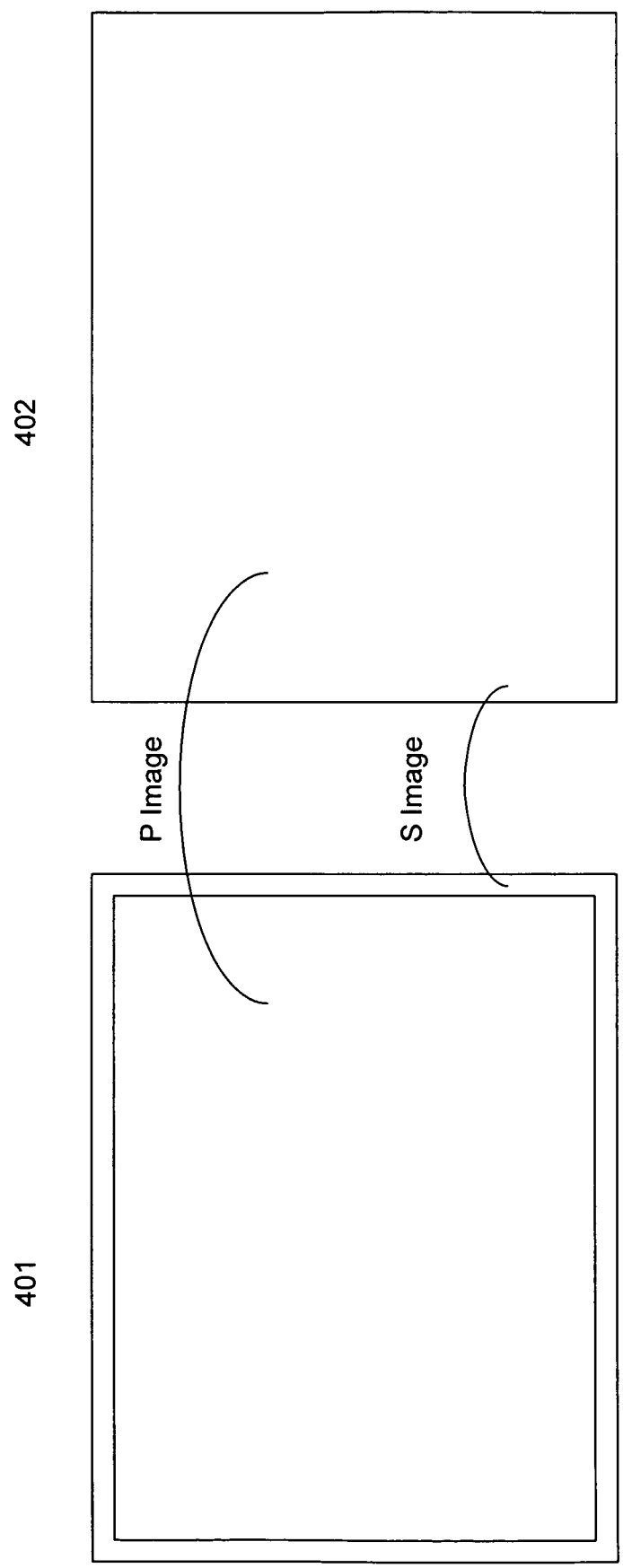
FIG. 4A represents uncompensated projection of stereoscopic images using the design of FIG. 3A having a reflective surface.
FIG. 4C illustrates compensated projection using an altered, typically curved, reflective surface in the design of FIG. 3.

As noted, the optical path lengths of the P-polarization and S-polarization states, as given in FIG. 3, are of unequal length. The S path is longer. Hence its image will be larger than the image formed by the P path. Albeit this is a small path difference compared with the throw from projector to projection screen but it is long enough to create a significant difference in magnification between the two beams. Both images must substantially coincide and be of the same magnification to within a fine tolerance. The resultant images, uncompensated, are shown in FIG. 4A, wherein the S image is larger than the P image and should be brought into coincidence as shown in FIG. 4C.

Figure 4B:
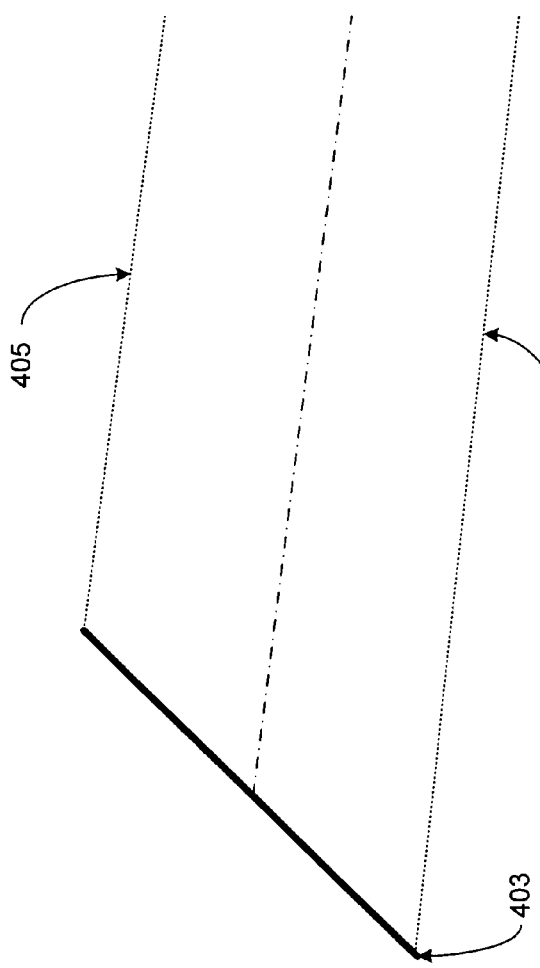
FIG. 4B shows reflection of a reflective surface.
Figure 4D:
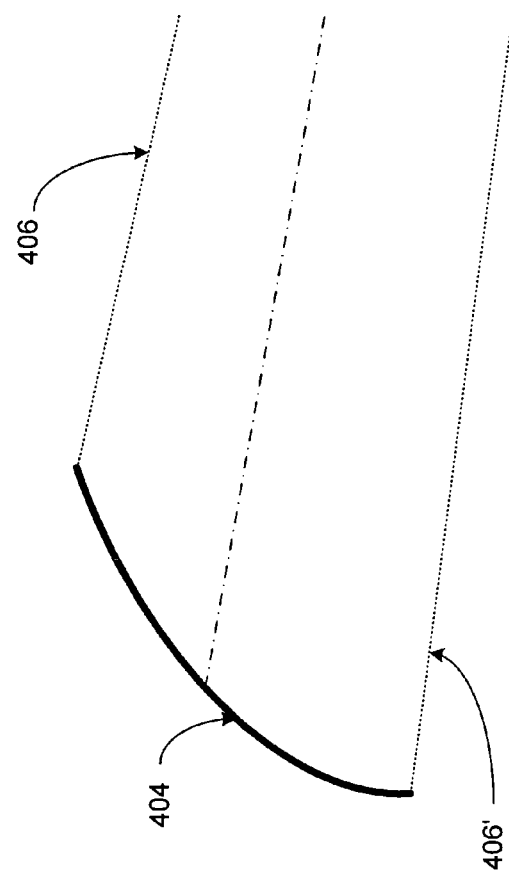
FIG. 4D shows a deformable reflective surface or mirror that may be employed in the design of FIG. 3 to provide S and P beam transmissions such as is shown in FIG. 4C.

Bringing images into coincidence is achieved using the deformable mirror 308 shown in FIG. 3 and as additionally shown in FIGS. 4B and 4D. The reflective surface or mirror 408 in its flat state or non-deformed state is shown at 403. Mirror 408 is shown with a concave curve in 404. Note that light rays 405 and 405' originating from the extreme edges of the image are divergent compared to the light rays shown at 406 and 406'. The slight curvature required, exaggerated here from actual practice for didactic purposes, is provided by deforming the relatively thin mirror 408 by a minute amount by pulling on its center or a point on the rear of the mirror 308 as shown conceptually by element 318. The mechanical means for achieving this are generally understood in the art and employed in various optical devices such as telescopes. In setting up the design, a technician adjusting the light enhancer or mirror 308 observes the screen 309, possibly with a telescope from the projection booth, and by means of employing the proper target can make adjustments to element 318 and mirror 308's curvature to bring the S and P images into coincidence.

The present design may be employed not only for single projector projection as shown in FIG. 3 for use with a polarization modulator such as a ZScreen or similar polarization switching device, but it may also be used for dual projection systems as described in FIG. 2. FIG. 5A shows a nearly identical arrangement of parts with the exception that the polarization device is replaced by the present design. All parts in FIG. 5A are shown mirror image as an illustration convenience. In FIG. 5A, imaging surface 501 is an imaging surface associated with the left projector and lens 502 is the corresponding lens. Device 507 is the present dual path device placed in the optical path. The screen, surface, or polarization conserving screen 505 receives light energy and audience member 506 wears analyzing spectacles or eyewear 509. The right projector imaging surface 503 includes corresponding lens 504 and dual path device 508. Similar to FIG. 3, FIG. 5A may also include mirrors 551, 571; mechanical elements 552, 572 capable of pulling or pushing a point such as the center of the surface of the reflective surfaces 551, 571 to form an approximation of an elliptical surface to provide the required optical power; polarization modulators or ZScreens 553, 573, 556, 576; retarders (e.g., half wave retarders) 554, 574; clean up polarizers 555, 557, 575, 577; and splitting elements (e.g., pllarizing splitters) 558, 578.

The dual projection apparatus shown in FIG. 5A may be used for several approaches to projection. In every case described herein the P and S combiner operates as described above and polarization modulators such as the ZScreens are provided such as is shown in FIG. 5A. One category of projection uses the ZScreen electro-optical polarization modulators such as polarizing modulators/ZScreens 5057 and 5077 employed in the steady-state mode as described in co-pending U.S. patent application Ser. No. 11/367,617, entitled "Steady State Surface Mode Device for Stereoscopic Projection," inventor Lenny Lipton, filed Mar. 3, 2006, which is hereby incorporated by reference. Such polarization modulators serve to supply circularly polarizer light of left-handedness for one projector and right-handedness for the other. It is immaterial which projector provides left or right handed circularly polarized light. The modulators are not used to switch between polarization states as depicted, for example, in FIGS. 3 and 6A or in detail with respect to FIG. 1B. Rather, each modulator is run as a tunable quarter wave plate so as to optimize its wavelength setting and substantially match the characteristics of the analyzers in the selection device eyewear.

In the present design, the polarization modulator device is similar in functionality to that which is shown in FIG. 5B insofar as it resembles traditional devices used to project stereoscopic images with each projector assigned to the task of providing one and only one perspective view.

In a second category of projection, the ZScreen electro-optical polarization modulator can be used in either one of two ways described in a co-pending application being concurrently filed, entitled "Dual ZScreen Projection," inventors Matt Cowan, Lenny Lipton, and Josh Greer, the entirety of which is incorporated herein by reference. In the first subcategory the modulators are run in synchrony with each projector providing one perspective view. In other words, each projector provides a specific perspective view.

In the second sub-category the left and right images are mixed for both left and right images to be projected by the left projector and both left and right images to be projected by the right projector. Such a design may be employed as the polarization modulators described herein with possible slight changes to the components described.

FIG. 5B removes the electro-optical polarization modulators from the design. From FIG. 5B, the projection system includes an imaging surfaces 5001 and 5003 inside the projector (not shown) and projection lenses 5002 and 5004. Light from a light source within the projector is sent to the corresponding projection lens. The system of FIG. 5B separates each light beam into two paths, a primary path P and a secondary path S, or more specifically into orthogonal polarization states using polarizing splitter 5058 and 5078. Polarizing splitter 5058 and 5078 may be a polarizing beamsplitter such as a glass prism or MacNeille prism, or a wire grid polarizer, or other device able to create separate orthogonal polarization in the P and S beams. In such a case the polarized P rays 5020 and 5030 project straight through the splitter 5058 and 5078, along a primary path, and the polarized S rays 5021 and 5031 are reflected along a secondary path. Device 5007 is the present dual path device placed in the optical path. The screen, surface, or polarization conserving screen 5005 receives light energy and audience member 5006 wears analyzing spectacles or eyewear 5009. The right projector imaging surface 5003 includes corresponding lens 5004 and dual path device 5008.

The polarized S ray is, in one embodiment rotated by 90 degrees using a half wave retarder 5054 and 5074. In an alternative embodiment, the polarized S ray remains non-rotated and the polarized P ray is alternately rotated by placing the half wave retarder in the transmitted beam instead of the reflected beam, or in other words, a half wave retarder is placed after the polarizing splitter 5058/5078 or between polarizing splitter 5058/5078 and projection screen 5005.

Static polarizers 5055/5075 and 5057/5077 of opposite polarity are provided to provide the proper polarization for the light energy received. Any clean-up polarizer may be placed in any location after the polarizing splitter or wire grid polarizer 5058/5078 in the device shown.

At this point, the device is projecting two beams of light, the primary P beam and reflected beam or secondary S beam, respectively. The secondary S beam needs to bend in the direction of the projection screen 5005. A reflective surface such as a mirror 5051 or 5071 (or other reflecting device such as a prism) can be used to do this bending. The mirrors 5051 and 5071 adjust beam path angles such that the primary and secondary beams may be aligned precisely on the projection screen 5005. The mirror 5051 or 5071 is therefore preferably deformable to provide optical power, adjust for the difference in magnification of the two beams, and substantially match the magnification of the primary path and secondary path to strike the same position on the projection screen 5005. The deformable mirror or reflective surface 5051 or 5071 again may be an essentially planar front surface mirror with a mechanical element 5052 or 5072 capable of pulling or pushing a point such as the center of the surface of the reflective surface to form an approximation of an elliptical surface to provide the required optical power. As with FIG. 3, more than one mechanical element may be employed and any mechanical element employed may be positioned anywhere around the reflective surface. The mirror or reflective surface may also be deformed using other means.

Two projectors having static polarizers are provided in the design of FIG. 5B. The purpose of FIG. 5B as opposed to FIG. 5A is to provide a simple static polarizer design (linear or circular) that obviates the need for polarization modulators. Operation of the two embodiments of FIGS. 5A and 5B are fundamentally different. Rather than having a uniform circularly polarized pair of projection devices wherein the modulators produce alternating polarization states (FIG. 5A), the dual projection system of FIG. 5B produces images having orthogonal projection axes thereby producing the desired stereoscopic effect, and thus different images are projected by imaging surfaces 5001 and 5003.

Figure 6A:
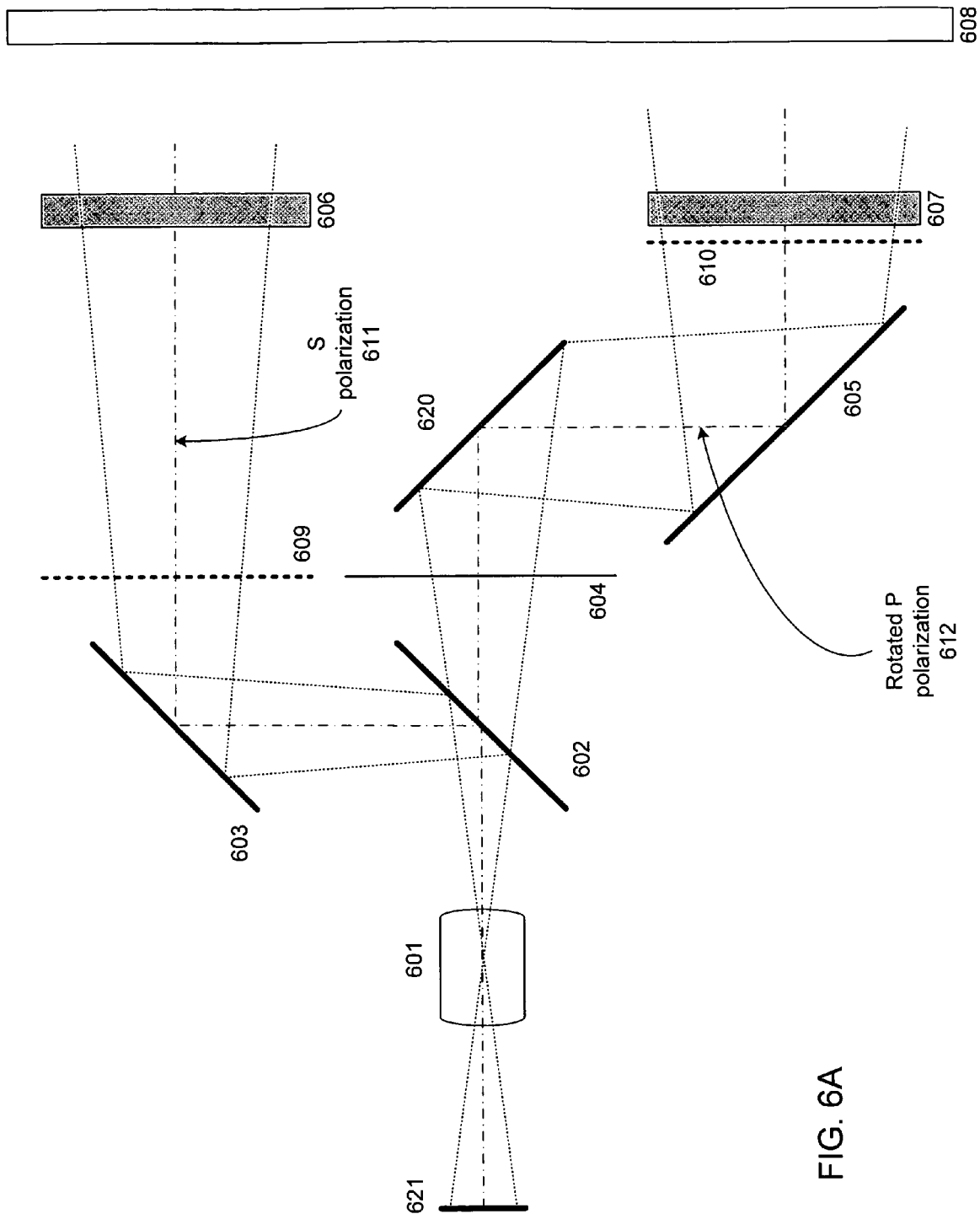
FIG. 6A is an alternate embodiment including elements to equalize the primary and secondary path lengths of light energy in an embodiment designed to achieve the same ends as those delineated in FIG. 3.

FIG. 6A shows an alternative embodiment of the system for enhanced stereoscopic projection. The implementation of FIG. 6A seeks to equalize the optical path lengths of the P and S beams. As in FIG. 3, the image is sent from the projector in the form of light energy provided from imaging surface 621 through a projection lens 601 and enters the splitter, or polarizing splitter 602. Again, the polarizing splitter 602 may be any appropriate polarizing beamsplitter such as a glass prism or MacNeille prism, or a wire grid polarizer, or other device able to create separate P and S polarized beams. The P beam is polarized 612 when transmitted straight through the polarizing splitter 602 along a primary path and the S beam is polarized 611 when reflected from the splitter along a secondary path in the direction shown. The reflected beam or secondary path beam is reflected toward the projection screen 608 using a prism or front surface planar mirror 605. The path length from the projector lens 601 to the projection screen 608 is increased by the length of the offset beam. The primary beam, P, has its polarization state rotated using a half wave retarder 604 so that its polarization is coincident with the polarization of the secondary S beam. Note that a retarder may be placed in either the transmitted or reflected beam path.

A pair of prisms 605 and 620 or front surface mirrors is used to increase the path length of the transmitted beam in order to match the path length of the reflected beam. The purity of polarization of the reflected and transmitted beams may be inadequate, and thus the system may benefit from an optional clean-up polarizer 609, 610 on one or both of the beams, again position independent but positioned depending on circumstances that may be determined empirically. The beams are then modulated as described with respect to FIG. 1 using the polarization modulators 606, 607, such as ZScreens, and the light projected to the projection screen 608. The arrangement of FIG. 6 serves to substantially optically superimpose light energy transmission between the second path and the first path.

Figure 6B:
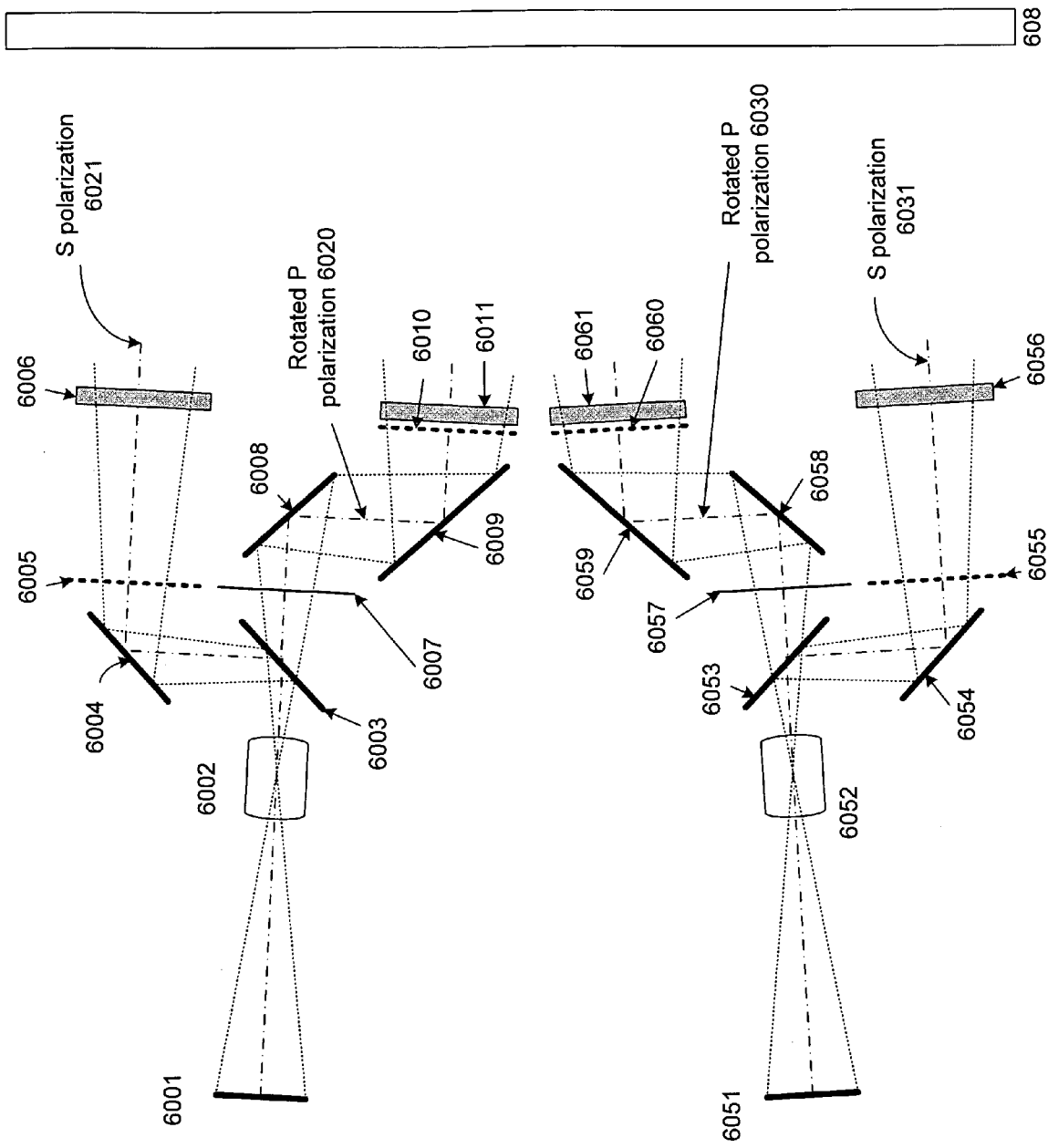
FIG. 6B represents a dual projection version of the embodiment of FIG. 6A.

FIG. 6B illustrates essentially a dual projector setup that comprises two of the arrangement of FIG. 6A. The image is sent from each projector in the form of light energy provided from imaging surface 6001/6051 through a projection lens 6002/6052 and enters the splitter, or polarizing splitter 6003/6053. Again, the polarizing splitter 6003/6053 may be any appropriate polarizing beamsplitter such as a glass prism or MacNeille prism, or a wire grid polarizer, or other device able to create separate P and S polarized beams. The P beam 6020/6030 becomes polarized when transmitted straight through the polarizing splitter 6003/6053 along a primary path and the S beam becomes polarized 6021/6031 as it is reflected from the splitter along a secondary path in the direction shown. The reflected beam or secondary path beam is reflected toward the projection screen 608 using a prism or front surface planar mirror 6004/6054. The path length from the projector lens 6001/6051 to the projection screen 608 is increased by the length of the offset beam. The polarization of the primary beam, P, is rotated using a half wave retarder 6007/6057 so that its polarization is coincident with the polarization of the secondary S beam. Note that a retarder 6007/6057 may be placed in either the transmitted or reflected beam path.

A pair of prisms 6008/6058 and 6009/6059 or front surface mirrors is used to increase the path length of the transmitted beam in order to match the path length of the reflected beam. The purity of polarization of the reflected and transmitted beams may be inadequate, and thus the system may benefit from an optional clean-up polarizer 6005/6055, 6010/6060 on one or both of the beams, again position independent but positioned depending on circumstances. The beams are then modulated using the polarization modulators 6006/6056, 6011/6061 such as ZScreens, and the light projected to the projection screen 608.

Figure 6C:
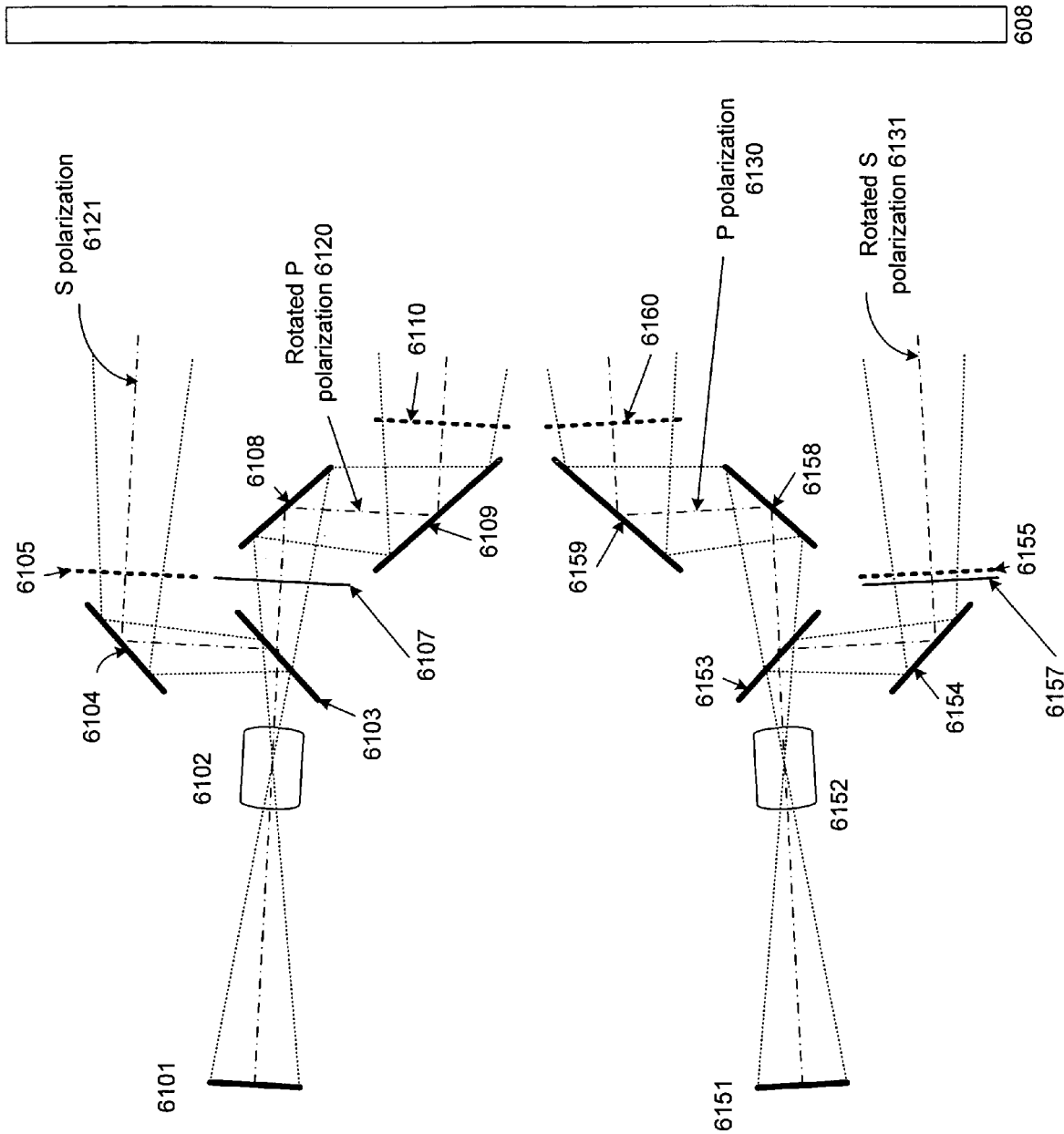
FIG. 6C shows a linear polarizer alternative to the design of FIG. 6B, using no polarizing modulators but again operating in a fundamentally different manner.

FIG. 6C is a similar design to that of FIG. 6A that omits the polarizing modulators, and in that regard resembles FIG. 5B. As with FIG. 5B, the purpose of FIG. 6C as opposed to FIG. 6B is to provide a simple static linear or circular polarizer design that obviates the need for polarization modulators. Operation of the two embodiments of FIGS. 6B and 6C are fundamentally different. Rather than having a uniform circularly polarized pair of projection devices wherein the modulators produce specific images (FIG. 6B), the dual projection system of FIG. 6C produces images having orthogonal projection axes thereby producing the desired stereoscopic effect, and thus different images are projected by imaging surfaces 6101 and 6151.

From FIG. 6C, orthogonal images may be sent from each projector in the form of light energy provided from imaging surface 6001/6151 through a projection lens 6102/6152 and enters the splitter, or polarizing splitter 6103/6153. Again, the polarizing splitter 6103/6153 may be any appropriate polarizing beamsplitter such as a glass prism or MacNeille prism, or a wire grid polarizer, or other device able to create separate P and S polarized beams. The P beam becomes polarized 6120/6130 when transmitted straight through the polarizing splitter 6103/6153 along a primary path and the S beam becomes polarized 6121/6131 when it is reflected from the splitter along a secondary path in the direction shown. The reflected beam or secondary path beam is reflected toward the projection screen 608 using a prism or front surface planar mirror 6104/6154. The path length from the projector lens 6101/6151 to the projection screen 608 is increased by the length of the offset beam. The polarized primary beam P on one projector is rotated using a retarder 6107. On the opposite projector, the opposite beam must be rotated, and in this case the secondary beam S is rotated using a retarder 6157. Note that a retarder 6107/6157 may be placed in either the transmitted or reflected beam path.

A pair of prisms 6108/6158 and 6109/6159 or front surface mirrors is used to increase the path length of the transmitted beam in order to match the path length of the reflected beam. The system also includes, as with FIG. 5B, two static sheet polarizers of opposite polarity 6105/6155, 6110/6160. Again, clean-up polarizers beyond the elements illustrated may be provided, positioned depending on circumstances.

As may be appreciated from the foregoing description, different components may be employed in accordance with the current design, including different components placed in different relative orientations. To that end, FIG. 7 is presented to show a general array of possible static polarizer designs in accordance with the current teachings. From FIG. 7, line 701 represents the element number from FIG. 3 as a general reference to the element being discussed. As shown in FIG. 7, the first projector transmits a primary beam and a secondary beam, while the second projector also transmits a primary beam and secondary beam. Each beam for each projector includes a retarder and a clean up (linear) polarizer. Reading down the left column of the table of FIG. 7, group 702 is for a linear polarizer having a polarizing beam splitter assembly in symmetrical orientation, wherein one channel needs rotation. Group 703 is for a linear polarizer with one projector's polarizing beam splitter rotated 90 degrees about an optical axis. Group 704 is for a polarizing beam splitter arranged symmetrically on the left and right projectors, and group 705 is for one polarizing beam splitter oriented or rotated 90 degrees from the other. As may be appreciated from the next column, polarization may be linear for groups 702 and 703 and circular for groups 704 and 705.

Taking as a first example the third entry in group 702, the polarization is linear, and for the first projector, the retarder for the primary beam is a half wave retarder, and no clean-up polarizer, corresponding to clean-up polarizer 315, is required. For the secondary beam, no retarder, corresponding to retarder 306, is required and no clean-up polarizer, corresponding to clean-up polarizer 305, is required. For the second projector, the retarder for the primary beam is not required, and no clean-up polarizer, corresponding to clean-up polarizer 315, is required, For the secondary beam, a half wave retarder, corresponding to retarder 306, is necessary, but no clean-up polarizer, corresponding to clean-up polarizer 305, is required.

Taking as a second example the third entry in group 705, the polarization is circular, and for the first projector, the retarder for the primary beam is a quarter left retarder, and no clean-up polarizer, corresponding to clean-up polarizer 315, is required. For the secondary beam, a quarter right retarder is required, corresponding to retarder 306, is required, and a linear clean-up polarizer, corresponding to clean-up polarizer 305, is required. For the second projector, the retarder for the primary beam is a quarter left retarder, and again no clean-up polarizer, corresponding to clean-up polarizer 315, is required. For the secondary beam, a quarter right retarder is necessary, corresponding to retarder 306, and a linear clean-up polarizer, corresponding to clean-up polarizer 305, is also required. The result is a polarizing beam splitter rotated 90 degrees from the other.

The design presented herein and the specific aspects illustrated are meant not to be limiting, but may include alternate components while still incorporating the teachings and benefits of the invention, namely the dual path stereoscopic projection system disclosed and claimed herein. As noted, none of the drawings presented are to scale. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. An apparatus for projecting stereoscopic images, comprising:
    a polarizing splitting element configured to receive image light energy and split the image light energy received into a primary path of light energy transmitted along a primary path and a secondary path of light energy transmitted along a secondary path;
    a reflector configured to receive path light energy from one of primary path energy and secondary path light energy and to direct said path light energy toward a surface; and
    a first polarization modulator positioned in the primary path and configured to receive the primary path of light energy, uniformly modulate the primary path of light energy into primary path modulated light energy, and transmit primary path modulated light energy toward the surface.

2. The apparatus of claim 1, further comprising a retarder configured to receive the secondary path of light energy and transmit retarded secondary path light energy.

3. The apparatus of claim 1, wherein the surface comprises a projection screen.

4. The apparatus of claim 1, wherein reflected secondary path light energy passes is directed through a portion of the first polarization modulator.

5. The apparatus of claim 1, further comprising a second polarization modulator configured to receive secondary path light energy, uniformly modulate the secondary path light energy, and transmit modulated secondary path light energy toward the reflector.

6. The apparatus of claim 1, wherein the reflector comprises a deformable mirror configured to substantially optically superimpose light energy transmission between the second path and the first path.

7. The apparatus of claim 1, further comprising a cleanup polarizer positioned in the secondary path.

8. The apparatus of claim 7, further comprising a cleanup polarizer positioned in the primary path.

9. The apparatus of claim 1, wherein the polarization modulator comprises a push-pull modulator.

10. The apparatus of claim 1, wherein the polarizing splitting element comprises one from a group comprising:
    a polarizing beamsplitter;
    a wire grid polarizer; and
    a MacNeille prism.

11. The apparatus of claim 1, further comprising a primary path element arrangement configured to substantially optically superimpose light energy transmission between the second path and the first path.

12. The apparatus of claim 11, wherein the primary path element arrangement comprises:
- a plurality of reflective surfaces; and
- a retarder.

13. The apparatus of claim 2, wherein the retarder is a half wave retarder.

14. The apparatus of claim 1, further comprising a projection lens receiving light energy from an imaging surface and transmitting the image light energy toward the splitting element.

15. The apparatus of claim 9, wherein the push pull modulator comprises an arrangement of two pi-cells having axes crossed and driven out of phase.

16. A method of projecting stereoscopic images, comprising:
- receiving image light energy;
- splitting the image light energy received into a primary path of light energy transmitted along a primary path and a secondary path of light energy transmitted along a secondary path;
- receiving secondary path light energy and directing reflected secondary path light energy toward a surface; and
- uniformly modulating the polarization of the primary path of light energy into primary path modulated light energy, and transmitting primary path modulated light energy toward the surface.

17. An apparatus for projecting stereoscopic images, comprising:
- a splitter configured to split the image received into a primary path and a secondary path;
- a reflector positioned in the secondary path configured to reflect secondary path light energy; and
- a polarization modulator arrangement comprising at least one polarization modulator positioned in the primary path and configured to uniformly modulate the primary path of light energy;
- wherein the polarization modulator arrangement additionally uniformly modulates secondary path light energy.

18. The apparatus of claim 17, further comprising a retarder positioned in one of the primary path and the secondary path and configured to rotate light energy received.

19. The apparatus of claim 17, wherein the polarization modulator arrangement comprises two polarization modulators, one in the primary path and one in the secondary path.

20. The apparatus of claim 17, wherein the polarization modulator arrangement comprises a single polarization modulator that modulates light energy in the primary path and the secondary path.

21. The apparatus of claim 17, further comprising elements configured to substantially optically superimpose light energy transmission between the primary path and the secondary path.

22. An apparatus for projecting stereoscopic images, comprising:
- a polarizing splitting element configured to receive image light energy and split the image light energy received into a primary path of light energy transmitted along a primary path and a secondary path of light energy transmitted along a secondary path;
- a reflector configured to receive path light energy from one of primary path energy and secondary path light energy and to direct said path light energy toward a surface; and
- a static polarizer element positioned at the output of one of said primary path light energy and said secondary path light energy, the static polarizer element configured to rotate the one of said primary path light energy and said secondary path light energy; and
- a first polarization modulator positioned in the primary path and configured to receive the primary path of light energy, uniformly modulate the primary path of light energy into primary path modulated light energy, and transmit primary path modulated light energy toward the surface.

23. The apparatus of claim 22, further comprising a second projector polarizing splitting element, a second projector reflector configured to receive orthogonally oriented light energy, said orthogonal orientation with respect to said image light energy, and a second projector static polarizer element.

* * * * *